(12) United States Patent
Jin

(10) Patent No.: US 8,694,278 B2
(45) Date of Patent: Apr. 8, 2014

(54) IHS SECURITY SYSTEM

(75) Inventor: Jie Jin, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 456 days.

(21) Appl. No.: 13/044,342

(22) Filed: Mar. 9, 2011

(65) Prior Publication Data

US 2012/0232828 A1 Sep. 13, 2012

(51) Int. Cl.
*G01D 1/00* (2006.01)
*G08B 13/14* (2006.01)
*G06F 17/00* (2006.01)

(52) U.S. Cl.
USPC ............................ 702/127; 340/572.9; 463/29

(58) Field of Classification Search
USPC .............. 702/127, 33, 81, 84, 104, 182–183, 702/188–189; 463/29, 40, 42; 340/571, 340/572.9
See application file for complete search history.

(56) References Cited

U.S. PATENT DOCUMENTS

2007/0155512 A1* 7/2007 Wells et al. ..................... 463/46

* cited by examiner

*Primary Examiner* — Toan Le
(74) *Attorney, Agent, or Firm* — Haynes and Boone, LLP

(57) ABSTRACT

A method for providing information handling system (IHS) security includes providing a plurality of monitored IHSs coupled to a monitoring IHS through a network. A physical lock status is determined for each of the plurality of monitored IHSs using a respective lock sensor located in each monitored IHS. The physical lock status is received by the monitoring IHS for each of the plurality of monitored IHSs over the network. A security report that includes the physical lock status for each of the plurality of monitored IHSs is created. The security report is displayed on a display coupled to the monitoring IHS.

20 Claims, 10 Drawing Sheets

IHS SECURITY SYSTEM

BACKGROUND

The present disclosure relates generally to information handling systems (IHSs), and more particularly to an IHS security system.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In some situations it may be desirable to provide for increased security for a plurality of IHSs. For example, in a networked IHS environment such as a place of business, IHS users may be asked to physically secure their IHSs such that those IHSs may not be physically removed from the networked IHS environment. Conventionally, this may be done by providing a lock that is secured to a relatively immobile object (e.g., a wall, a desk, etc.) and that then may be attached to the IHS. A Kensington lock, available at www.us.kensington.com, is an example of one type of such lock. Attachment of the lock to the IHS prevents physical removal of the locked IHS from the networked IHS environment. However, some users may forget to attached the lock to their IHS, which leaves the IHS unsecure and vulnerable to theft. To remedy such situations, an IHS security administrator must go to the physical location of each IHS in the networked IHS environment to determine whether each IHS is attached to a lock and therefore secured, which is time consuming and tedious for the IHS security administrator.

Accordingly, it would be desirable to provide an improved IHS security system.

SUMMARY

According to one embodiment, a method for providing information handling system (IHS) security includes providing a plurality of monitored IHSs coupled to a monitoring IHS through a network, determining a physical lock status for each of the plurality of monitored IHSs using a respective lock sensor located in each monitored IHS, receiving the physical lock status for each of the plurality of monitored IHSs by the monitoring IHS over the network, creating a security report that includes the physical lock status for each of the plurality of monitored IHSs, and displaying the security report on a display coupled to the monitoring IHS.

BRIEF DESCRIPTION OF THE DRAWINGS

FIG. 2b is a cross-sectional view illustrating an embodiment of the monitored IHS of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
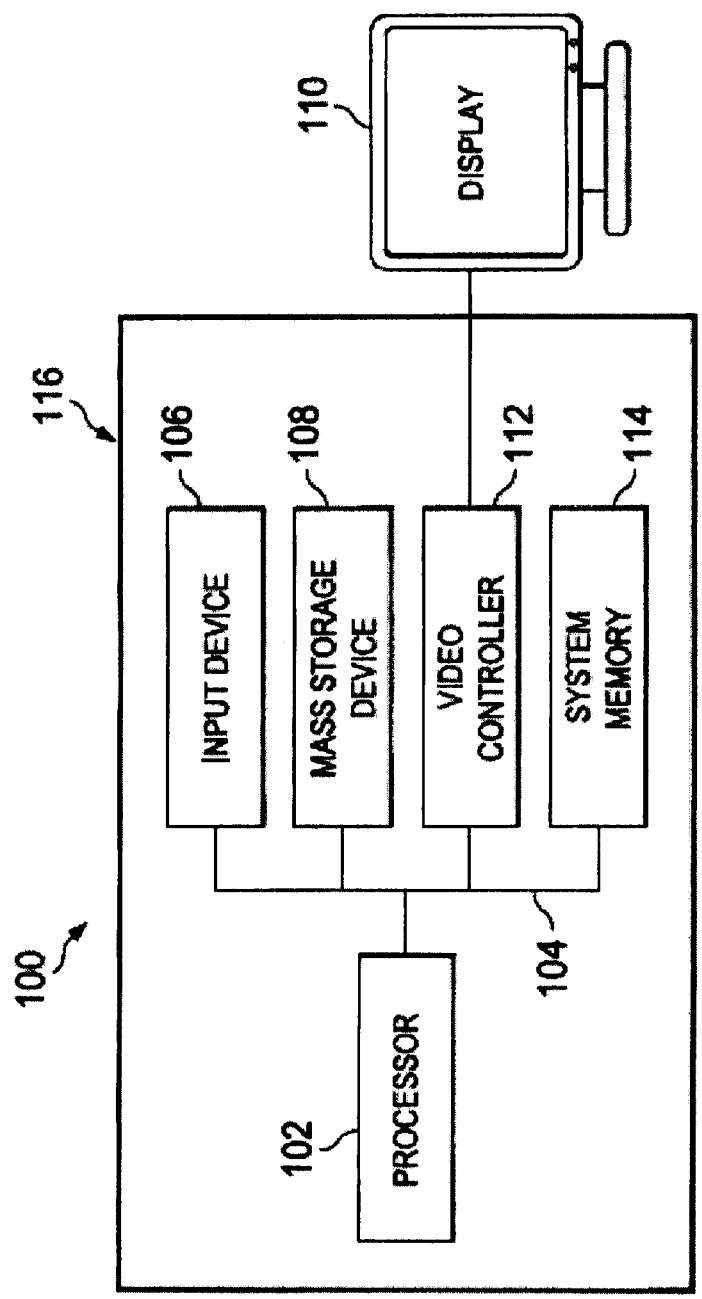
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
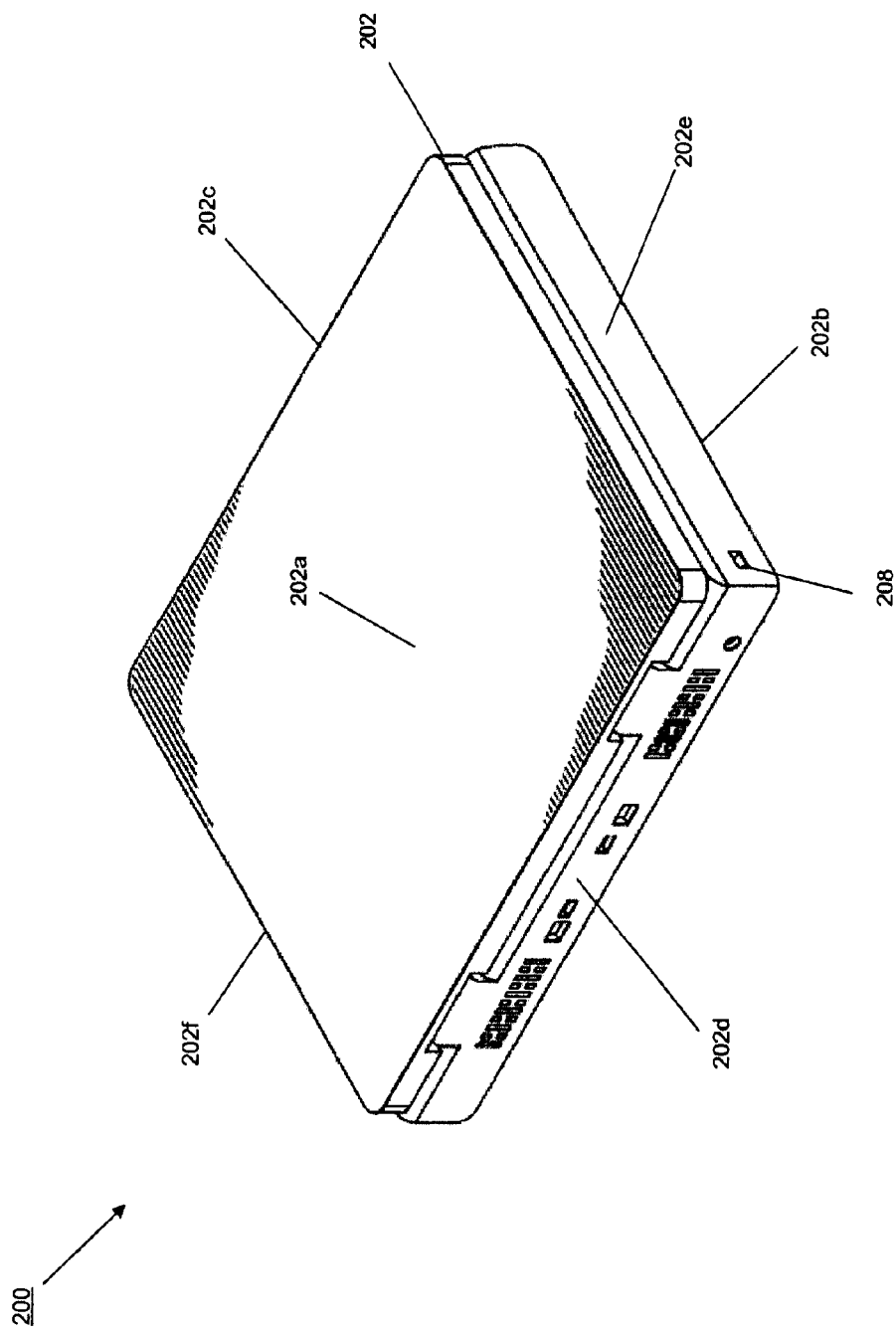
FIG. 2a is a perspective view illustrating an embodiment of a monitored IHS.
Figure 2B:
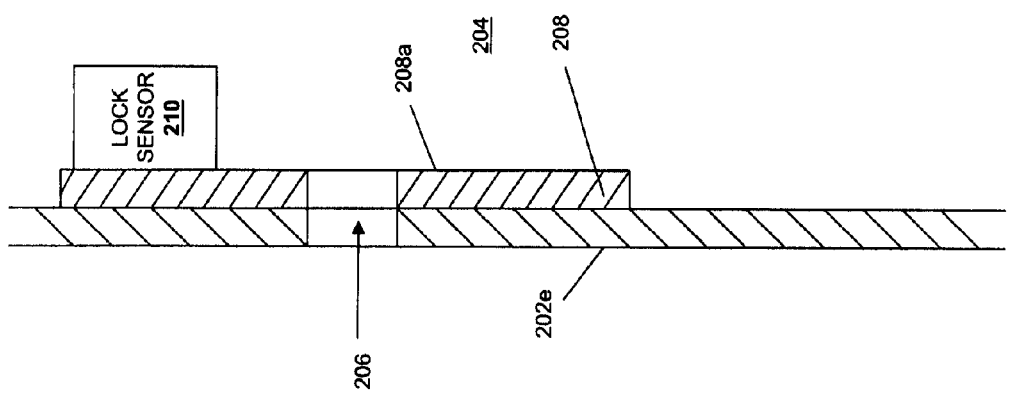

Referring now to FIGS. 2a and 2b, an IHS 200 is illustrated. In an embodiment, the IHS 200 may be the IHS 100 described above with reference to FIG. 1. The IHS 200 includes a chassis 202 having a top surface 202a, a bottom surface 202b located opposite the base 202 from the top surface 202a, a front surface 202c extending between the top surface 202a and the bottom surface 202b, a rear surface 202d located opposite the base 202 from the frontsurface 202c and extending between the top surface 202a and the bottom surface 202b, and a pair of opposing side surfaces 202e and 202f extending between the top surface 202a, the bottom surface 202b, the front surface 202c, and the rear surface 202d. One of skill in the art will recognize that the IHS 200 illustrated in FIGS. 2a and 2b is a laptop/notebook IHS, but the present disclosure is not meant to be limited to this embodiment, and IHSs such as, for example, tablet/slate IHSs, netbooks, desktop IHSs, and/or a variety of other portable and semi-portable IHSs will fall within the scope of the present disclosure. An IHS housing 204 is defined by the IHS 200 between the top surface 202a, the bottom surface 202b, the front surface 202c, the rear surface 202d, and the side surfaces 202e and 202f. A lock channel 206 is defined by the side surface 202e and extends through the side surface 202e to the IHS housing 204. In an embodiment, a reinforcing member 208 is coupled to the side surface 202e, located in the IHS housing 204, and defines a portion of the lock channel 206. The reinforcing member 208 includes a stop surface 208a that is located opposite the reinforcing member 208 from the side surface 202e and faces the IHS housing 204. A lock sensor 210 is located adjacent the lock channel 206 and, in the illustrated embodiment, is coupled to the reinforcing member 208. In an embodiment, the lock sensor 210 may be a variety of sensors known in the art that are operable to detect when a lock member is positioned in the IHS housing 204 and/or oriented in specific orientation in the IHS housing 204, as discussed in further detail below. While specific components in a specific orientation have been illustrated for the IHS 200, one of skill in the art will recognize that components may be added to and removed from the IHS 200 (e.g., the reinforcing member 208 may be removed, the lock sensor may be coupled to the side wall 202e or another component of the IHS 200, etc.), without departing from the scope of the present disclosure.

Figure 3:
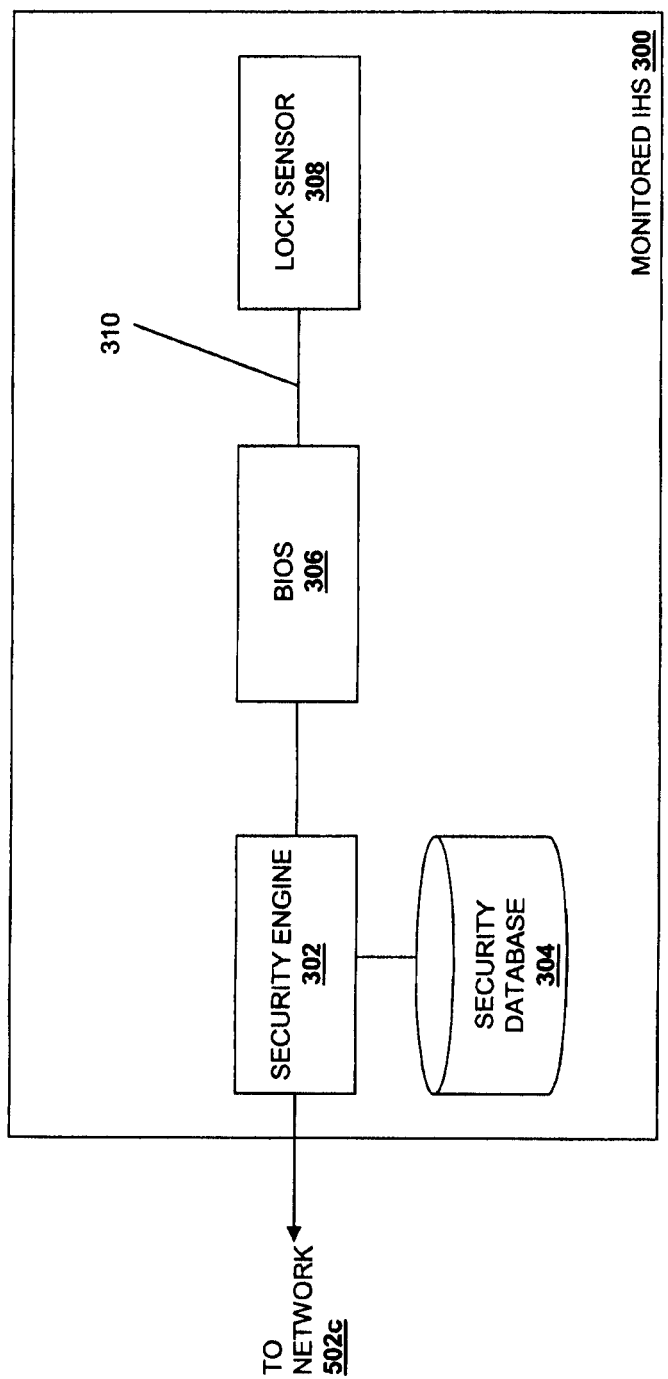
FIG. 3 is a schematic view illustrating an embodiment of a monitored IHS.

Referring now to FIG. 3, a monitored IHS 300 is illustrated. In an embodiment, the IHS 300 may be the IHS 100, described above with reference to FIG. 1, and/or the IHS 200, described above with reference to FIG. 2. The monitored IHS 300 includes a security engine 302 that is coupled to a network 502c, discussed in further detail below, a security database 304, and a Basic Input Output System (BIOS) 306 for the monitored IHS 300. In an embodiment, the security engine 302 may include software that is stored on a computer-readable medium and that includes instructions that, when executed by a processor (e.g., the processor 102), allow the security engine 302 to communicate with the BIOS 306 to retrieve a lock status for the monitored IHS 300, discussed in further detail below. In an embodiment, the security database 304 may store monitoring information for the monitoring IHS 300 such as, for example, a monitoring schedule for the monitoring IHS 300 and/or a security action parameter, discussed in further detail below. The BIOS 306 is coupled to a lock sensor 308, which may be the lock sensor 210, and may include software that is stored on a computer-readable medium and that includes instructions that, when executed by the processor (e.g., the processor 102), allow the BIOS 306 to receive a physical lock status from the lock sensor 306 using, for example, a dedicated General Purpose Interface (GPI) signal 310.

Figure 4:
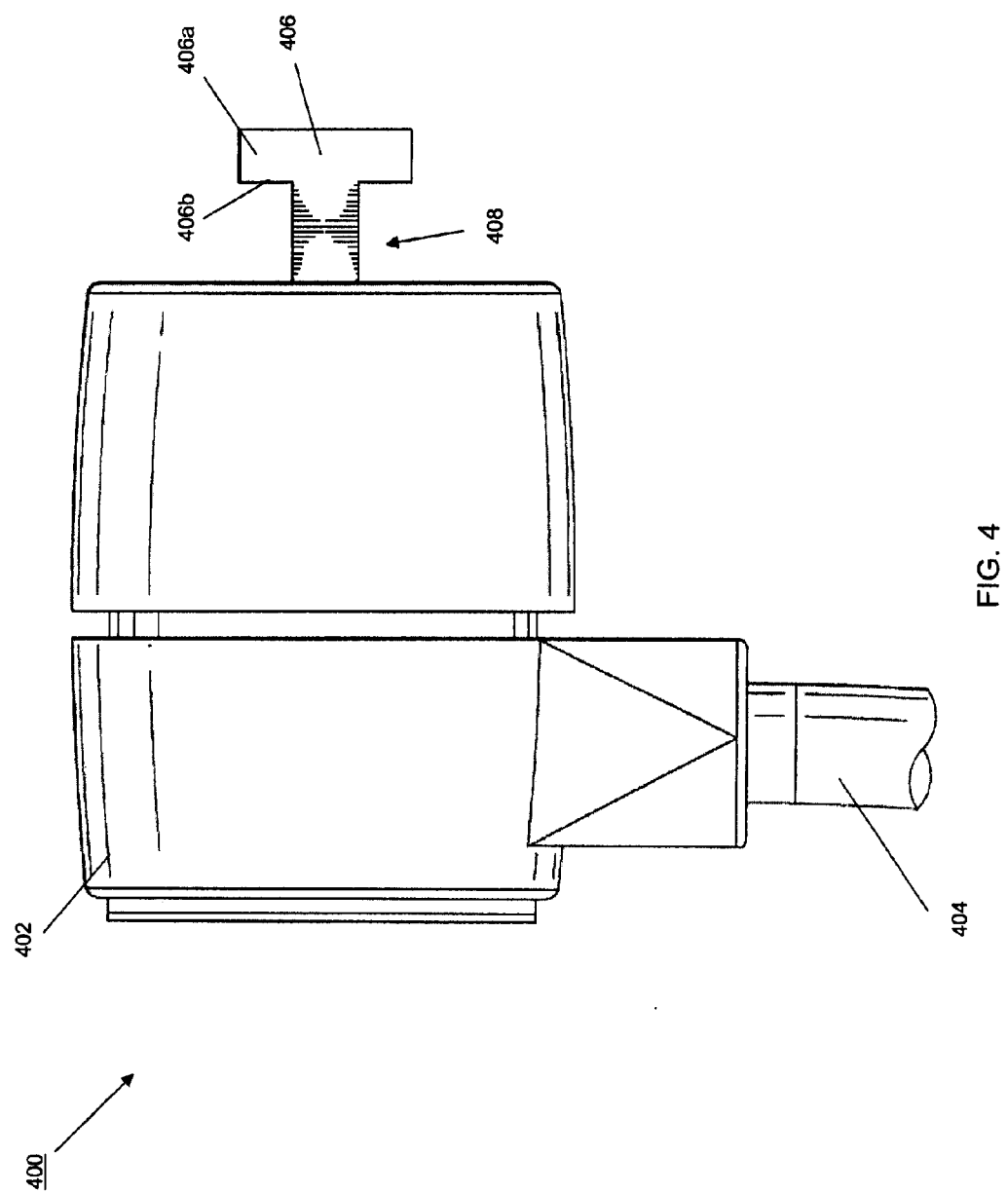
FIG. 4 is a side view illustrating an embodiment of a lock used with the monitored IHSs of FIGS. 2a, 2b, and 3

Referring now to FIG. 4, a lock 400 is illustrated. In an embodiment, the lock 400 is a Kensington lock, available at www.us.kensington.com. However, a variety of other locks known in the art may be substituted for a Kensington lock without departing from the scope of the present disclosure. The lock 400 includes a base 402 having a cable 404 that extends from the base 402. A T-shaped locking member 406 extends from the base 402 and includes a securing portion 406a having a securing surface 406b that defines a lock securing channel 408 between the base 402 and the securing surface 406b.

Referring now to FIGS. 2a, 2b, 4, 5a, 5b, and 5c, a method 500 for providing IHS security is illustrated. The method 500 begins at block 502 where a plurality of monitored IHSs are provided coupled to a monitoring IHS through a network. In an embodiment, a plurality of monitored IHSs 502a, which may be the IHS 100 described above with reference to FIG. 1, the monitored IHS 200 described above with reference to FIGS. 2a and 2b, and/or the monitored IHS 300 described above with reference to FIG. 3, are coupled to a monitoring IHS 502b, which may be the IHS 100 described above with reference to FIG. 1, through a network 502c. In an embodiment discussed below, the network 502c is an intranet, but the network 502c may be a variety of other networks known in the art with departing from the scope of the present disclosure. For example, the intranet network 502c may be provided by a network provider in a networked environment such as a place of business.

For a variety of reasons known in the art, the network provider may wish to physically secure each of the monitored IHSs 502a in the networked environment/place of business to ensure that the monitored IHSs 502a cannot be physically removed from the networked environment/place of business. To do so, each of the monitored IHSs 502a may be the monitored IHS 200 or an IHS having similar features, and the network provider or another entity may provide the lock 400 for each monitored IHS 200/502a. Each lock 400 may be secured to a relatively immobile object 502d such as, for example, a wall, a desk, a floor, and/or a variety of other relatively immobile objects known in the art, and then attached to one of the monitored IHSs 200, as illustrated in FIG. 5c. In one embodiment, the lock 400 may attached to the monitored IHS 200 by positioning the base 402 of the lock 400 adjacent the side surface 202e of the IHS 200 such that the locking member 406 is positioned adjacent the lock channel 206. The base 402 of the lock 400 is then moved towards the IHS 200 until the locking member 406 moves through the locking channel 206 and into the housing 204. The locking member 406 may then be activated using methods known in the art such as, for example, by turning the locking member 406 relative to the base 402, until the locking member 406 is oriented such that the side surface 202e and the reinforcing member 208 are positioned in the lock securing channel 408 defined by the lock 400 with the securing surface 406b on the locking member 406 immediately adjacent the stop surface 208a on the reinforcing member 208. With the side surface 202e and the reinforcing member 208 positioned in the lock securing channel 408, relative movement of the locking member 406, the base 402 of the lock 400, and the side surface 202e of the monitored IHS 200 may be restricted (i.e., by 'locking' the lock 400) such that the lock 400 is attached to the IHS 200 can cannot be detached without unlocking the lock 400. However, the physical securing of the monitored IHSs 200/502a using the lock 400 discussed above requires that the user of each monitored IHS 200/502a perform the physical securing and, as is known in the art, some users will forget or neglect to physically secure their monitored IHS 200/502a, which may require an IHS security administrator to go to the physical location of each of the monitored IHSs 200/502a to determine whether one of the locks 400 has been attached to each monitored IHS 200/502a.

The method 500 then proceeds to block 504 where each monitored IHS determines a physical lock status. As discussed above, the lock sensor 210 is operable to determine when the lock member 406 is positioned in the IHS housing 204 and/or oriented in specific orientation in the IHS housing 204. For example, in the illustrated embodiment, the lock sensor 210 may determine that the lock member 406 is located in the IHS housing 204 and/or oriented such that the side surface 202e and the reinforcing member 208 on the IHS 200 are positioned in the lock securing channel 408 defined by the lock 400. In an embodiment, the lock sensor 210 may be able to determine that the lock member 406 has been locked in position (e.g., in a specific orientation) relative to the base 402 of the lock 400 and/or the IHS 200. Thus, each monitored IHS 200/502a may use its associated lock sensor 210 to determine whether one of the locks 400 has been locked to that monitored IHS 200/502a. In an embodiment, the lock 400 may include features that allow the lock sensor 210 to determine whether the lock 400 has been locked to a monitored IHS 200/502a. In an embodiment, the monitored IHS 200/502a may be the monitored IHS 300 and the lock sensor 210 may be the lock sensor 308, described above with reference to FIG. 3, and the lock sensor 308 may communicate a physical lock status to the BIOS 306 using a dedicated GPI signal 310 that indicates whether the lock 400 has been locked to the monitored IHS 300 (e.g., an OPEN signal may be communicated to the BIOS in response to determining the lock 400 has been locked to the monitored IHS 300, and a CLOSED signal may be communicated to the BIOS in response to determining the lock 400 has not been locked to the monitored IHS 300.)

The method 500 then proceeds to block 506 where a monitoring IHS receives the physical lock status for each of a plurality of IHSs. The security engine 302 retrieves the physical lock status for the monitored IHS 300 from the BIOS 306 of the monitored IHS 300 that is provided by the lock sensor 308 and communicates that physical lock status to the monitoring IHS 502b over the network 502c. Thus, each monitored IHS 300/502a may provide a physical lock status to the monitoring IHS 502b. In an embodiment, the security database 304 in each monitoring IHS 300/502a includes at least one monitoring period that indicates to the security engine 302 when to communicate the physical lock status for that monitored IHS 300/502a. The at least one monitoring period may be provided by a user of the monitored IHS 300/502a or a user of the monitoring IHS 502b. In an embodiment, the at least one monitoring period may be submitted by a user of one of the monitoring IHSs 300/502a and authorized by a user of the monitoring IHS 502b, and the security engine 302 may only communicate the physical lock status according to that at least one monitoring period upon the authorization. In an embodiment, the security database 304 may be located outside of the monitoring IHS 300/502a (e.g., connected to the network 502c, part of the monitoring IHS 502b, etc.) without departing from the scope of the present disclosure. Furthermore, instead of indicating to the security engine 302 when to communicate the physical lock status, the at least one monitoring period may indicate to the monitoring IHS 502b when to retrieve the physical lock status or may indicate to the lock sensor 210/308 when to attempt to determine whether the lock 400 has been locked to a monitored IHS 200/300/502a.

Figure 5A:
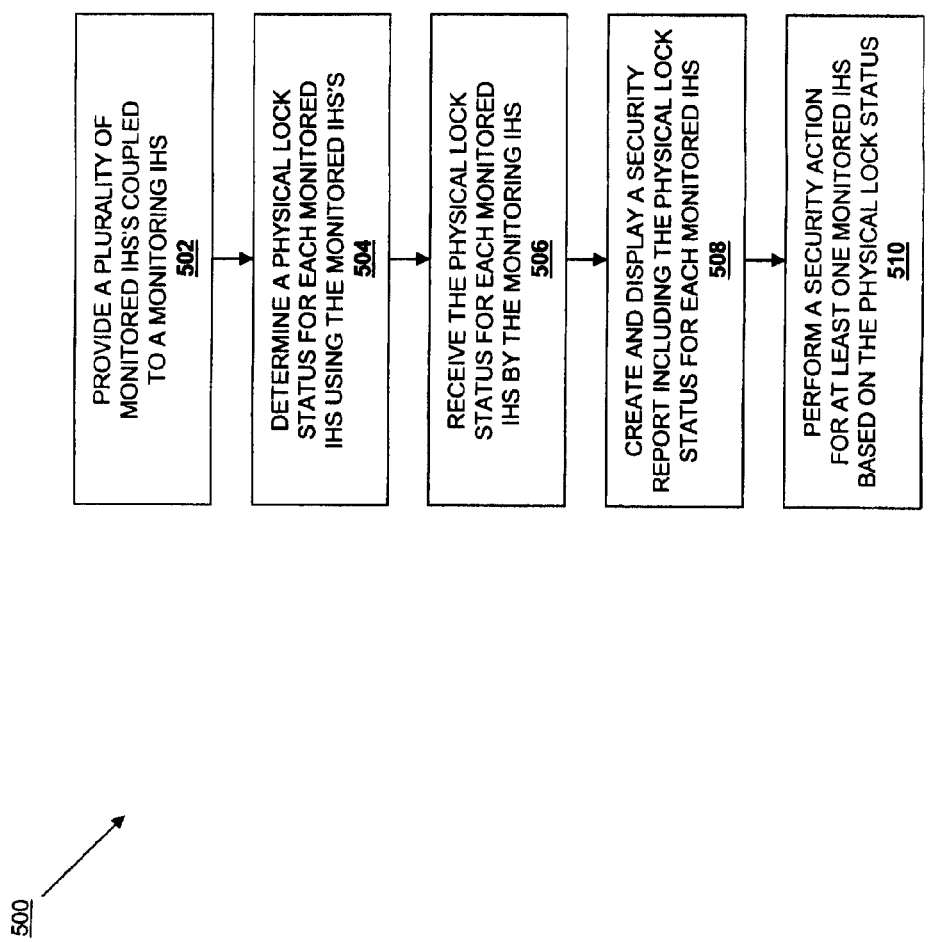
FIG. 5a is a flow chart illustrating an embodiment of a method for providing IHS security.
Figure 5B:
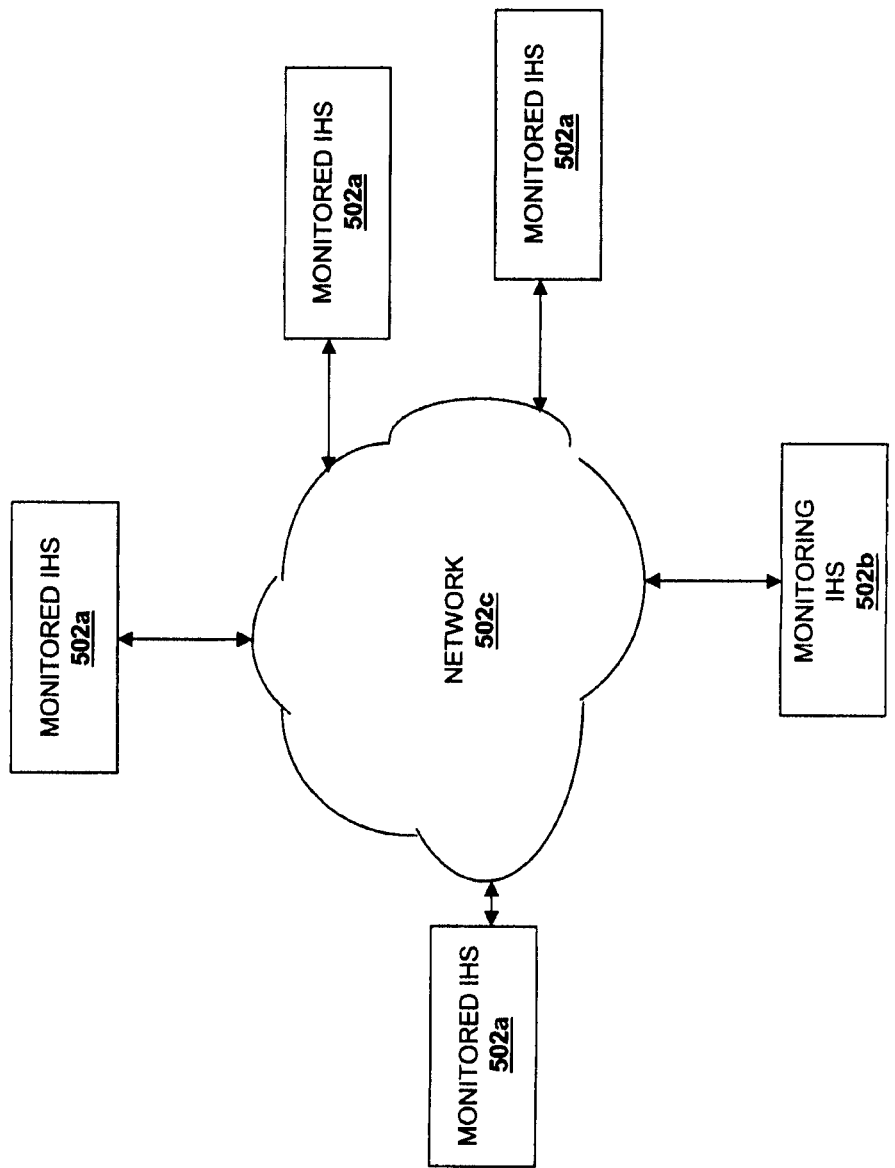
FIG. 5b is a schematic view illustrating an embodiment of a networked environment.
Figure 5C:
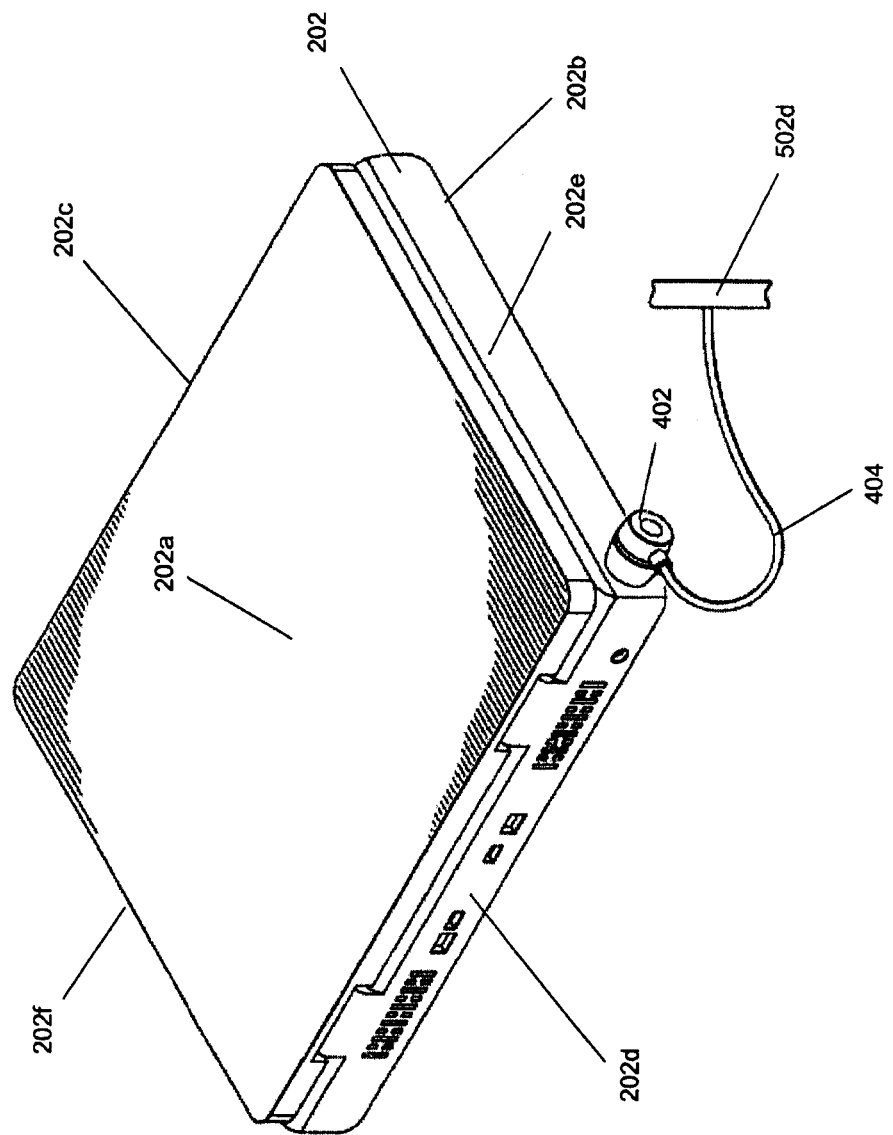
FIG. 5c is a perspective view illustrating an embodiment of the lock of FIG. 4 coupled to the monitored IHS of FIGS. 2a and 2b.
Figure 5D:
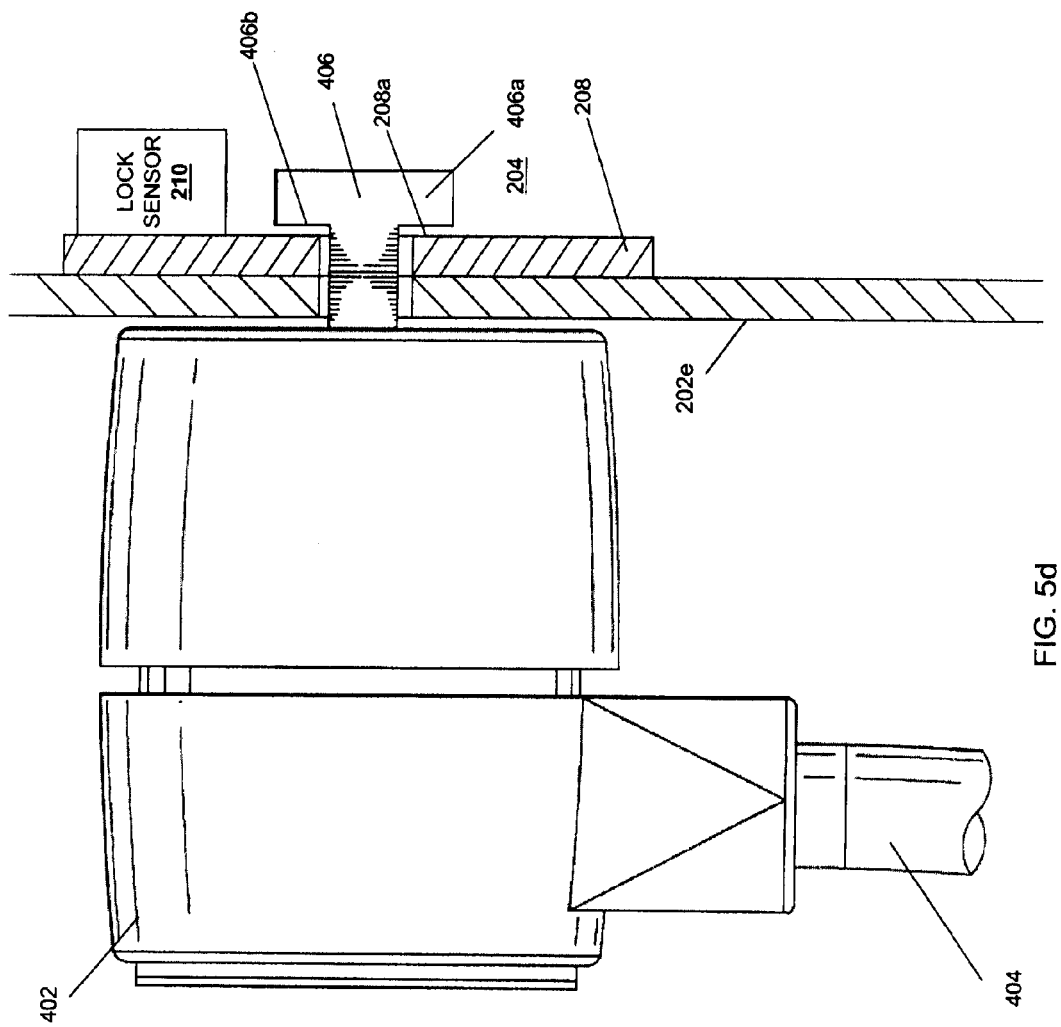
FIG. 5d is a cross-sectional view illustrating an embodiment of the lock of FIG. 4 coupled to the monitored IHS of FIGS. 2a and 2b.
Figure 5E:
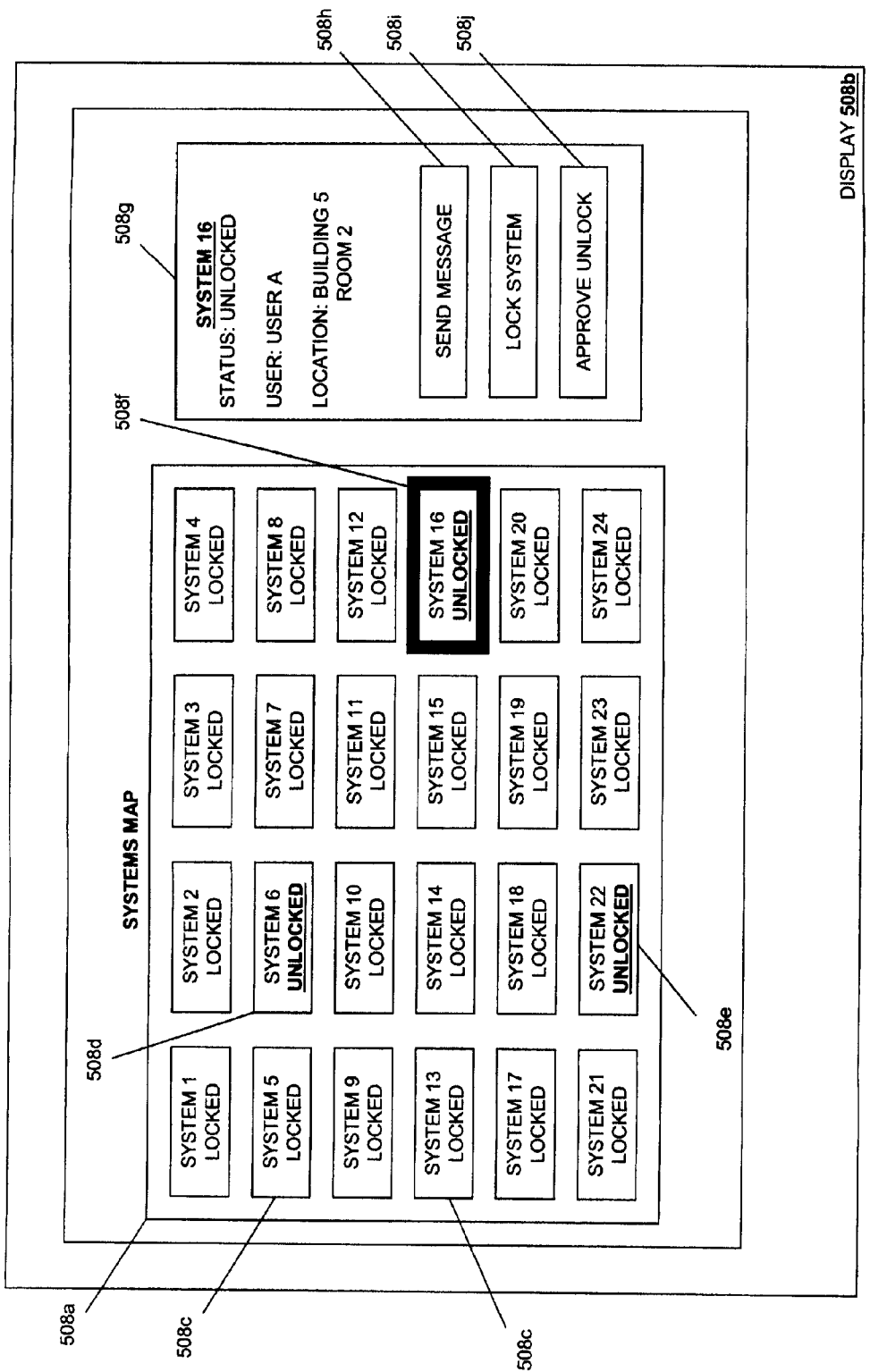
FIG. 5e is a screenshot illustrated an embodiment of a security report provided by a monitoring IHS.

Referring now to FIGS. 5a, 5b, and 5e, the method 500 proceeds to block 508 where a security report that includes a physical lock status for each of a plurality of monitored IHSs is created and displayed by a monitoring IHS. The monitoring IHS 502c uses the physical lock statuses received from each of the monitored IHSs 502a in block 506 of the method 500 and uses the physical lock statuses to create a security report 508a and display the security report 508a on a display 508b, which may be the display 110 described above with reference to FIG. 1. The security report 508a includes a plurality of indicators that correspond to the monitored IHSs 502a coupled to the monitoring IHS 502b through the network 502c. For example, in the illustrated embodiment, the indicators 508c indicate that a plurality of monitored IHSs 502a (e.g., systems 1-5, 7-15, 17-21, 23, and 24) are reporting a physical lock status of "LOCKED", while the indicators 508d, 508e, and 508f indicate that a plurality of monitored IHSs 502a (e.g., systems 6, 16, and 22) are reporting a physical lock status of "UNLOCKED". Furthermore, the selection of a particular indicator in the security report 508a (e.g., the indicator 508f in the illustrated embodiment) provides security details 508g retrieved by the monitoring IHS 502b about the monitored IHS 502a associated with, that indicator (e.g., the security status, a user associated with the monitored IHS 502a, a location of the monitored IHS 502, etc.) and provides a Send Message button 508h, a Lock System button 508i, and an Approve Unlock button 508j. discussed below.

The method 500 then proceeds to block 510 where a security action is performed on at least one monitored IHS that is based on the physical lock status of that at least one monitored IHS. For example, in response to determining that a monitored IHS 502a is reporting a physical lock status that indicates that the monitored IHS 502a is not secured with the lock 400, the monitoring IHS 502b may be operable to automatically send a message to that monitored IHS 502a. The message may be sent to unsecured monitored IHSs 502a to remind their users to attach the lock 400 to the monitored IHS 502a. The security engine 302 in the monitored IHS 300 may be operable to send similar reminder messages (e.g., to a display coupled to the monitored IHS 300) in response to determining that the monitored IHS 300 is not secured with a lock 400. In another example, the Send Message button 508h discussed above may be selected to send such a message to an unsecured monitored IHS 502a. In another example, in response to determining that a monitored IHS 502a has been unsecured for a period of time, the monitored IHS 502a may be automatically electronically locked so that a user is prevented from using that monitored IHS 502a. In an embodiment, the electronic lock of a monitored IHS 502a may be automatically disabled in response to determining that that monitored IHS 502a has been secured using one of the locks 400. In another example, the Lock System button 508i discussed above may be selected to electronically lock an unsecured monitored IHS 502a. The security engine 302 in the monitored IHS 300 may be operable to electronically lock the monitored IHS 400 in response to determining that the monitored IHS 300 is not secured with a lock. The Approve Unlock button 508j may be used to approve an unsecured monitored IHS 502a such that the messages and/or electronic locking discussed above is not performed on a monitored IHS 502a (e.g., when the monitored IHS is taken out of the networked environment or requires mobility within the networked environment.) A database may be used to store instructions for the monitoring IHS 502b that detail which monitored IHSs 502a to monitor, when to monitor one or more monitored IHSs 502a, and/or how, when, and what type of messages and/or electronic locking methods to use for one or more monitored IHSs 502a.

Thus, a system and method are provided that allow a plurality of IHSs to be monitored from a monitoring IHS to determine whether each of the monitored IHSs is physically secured in a networked environment. Techniques are provided to incentivize users of the IHSs to physically secure the IHS in the event it is determined that the IHS is not secured, and information about unsecured IHSs may be quickly and easily retrieved and used to ensure that all IHSs in a networked environment are physically secured.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Information Handing System (IHS) security system, comprising:
    a network;
    a plurality of monitored IHSs coupled to the network, wherein each of the plurality of monitored IHSs includes a lock sensor that is operable to determine a physical lock status for the monitored IHS; and
    a monitoring IHS coupled to the network and operable to receive the physical lock status for each of the plurality of monitored IHSs and display a security report that includes a respective monitored IHS indicator associated with each of the plurality of monitored IHSs, wherein each monitored IHS indicator includes the physical lock status received for its associated monitored IHS, and each monitored IHS indicator is selectable to display a physical location of its associated monitored IHS.

2. The IHS security system of claim 1, where the physical lock status for each of the plurality of monitored IHSs is related to whether a physical lock is inserted into that monitored IHS and locked.

3. The IHS security system of claim 1, wherein the lock sensor for each of the plurality of monitored IHSs is coupled to a Basic Input Output System (BIOS) in that monitored IHS, and wherein the lock sensor communicates the physical lock status to the BIOS.

4. The IHS security system of claim 3, wherein the lock sensor communicates the physical lock status to the BIOS using a dedicated General Purpose Interface (GPI) signal.

5. The IHS security system of claim 1, wherein the monitoring IHS is operable, in response to receiving an unlocked physical lock status for at least one of the plurality of monitored IHSs, to send the at least one of the plurality of monitored IHSs a message related to the unlocked physical lock status.

6. The IHS security system of claim 1, wherein the monitoring IHS is operable, in response to receiving an unlocked physical lock status for at least one of the plurality of monitored IHSs, to electronically lock the at least one of the plurality of monitored IHSs in response to the unlocked physical lock status.

7. The IHS security system of claim 1, further comprising:
    a security database coupled to the network and including at least one monitoring period, wherein each of the plurality of monitored IHSs is operable to transmit the physical lock status to the monitoring IHS only during the at least one monitoring period.

8. The IHS security system of claim 7, wherein the monitoring IHS is operable to authorize the at least one monitoring period.

9. An information handling system (IHS), comprising:
    a processor;
    a display coupled to the processor;
    a communications device coupled to the processor and operable to couple to a network; and
    a non-transitory, computer readable medium coupled to the processor, the non-transitory, computer readable medium including computer readable instructions that, when executed by the processor, cause the processor to access a Basic Input Output System (BIOS) on each of a plurality of monitored IHSs over the network, retrieve a physical lock status for each of a plurality of monitored IHSs from a respective BIOS, and create and display a security report on the display that includes a respective monitored IHS indicator that is associated with each of the plurality of monitored IHSs, wherein each monitored IHS indicator includes the physical lock status for of its associated monitored IHS, and each monitored IHS indicator is selectable to display a physical location of its associated monitored IHS.

10. IHS of claim 9, where the physical lock status for each of the plurality of monitored IHSs is related to whether a physical lock is inserted in that monitored IHS and locked.

11. The IHS of claim 9, wherein the non-transitory, computer readable medium further includes computer readable instructions that, when executed by the processor, cause the processor, in response to receiving an unlocked physical lock status for a first monitored IHS of the plurality of monitored IHSs, to send a message to the first monitored IHS that is related to the unlocked physical lock status.

12. The IHS of claim 9, wherein the non-transitory, computer readable medium further includes computer readable instructions that, when executed by the processor, cause the processor, in response to receiving an unlocked physical lock status for a first monitored IHS of the plurality of monitored IHSs, to electronically lock the first monitored IHS in response to the unlocked physical lock status.

13. The IHS of claim 9, further comprising:
    a security database that is coupled to the processor that that includes at least one monitoring period associated with a first monitored IHS of the plurality of monitored IHSs, wherein the non-transitory, computer readable medium further includes computer readable instructions that, when executed by the processor, cause the processor to receive the physical lock status of the first monitored IHS only during the at least one monitoring period associated with the first monitored IHS.

14. The IHS of claim 13, wherein the non-transitory, computer readable medium further includes computer readable instructions that, when executed by the processor, cause the processor to authorize the at least one monitoring period.

15. A method for providing information handling system (IHS) security, comprising:
    providing a plurality of monitored IHSs coupled to a monitoring IHS through a network;
    determining a physical lock status for each of the plurality of monitored IHSs using a respective lock sensor located in each monitored IHS;

receiving the physical lock status for each of the plurality of monitored IHSs by the monitoring IHS over the network; and creating and displaying a security report that includes a respective monitored IHS indicator that is associated with each of the plurality of monitored IHSs, wherein each monitored IHS indicator includes the physical lock status for of its associated monitored IHS, and each monitored IHS indicator is selectable to display a physical location of its associated monitored IHS.

16. The method of claim 15, further comprising:

transmitting the physical lock status for each of the plurality of monitored IHSs from the respective lock sensor located in each monitored IHS to a respective Basic Input Output System (BIOS) located in each monitored IHS, wherein the receiving the physical lock status for each of the plurality of monitored IHSs by the monitoring IHS over the network comprises receiving the physical lock status from each respective BIOS.

17. The method of claim 15, further comprising:

sending a message from the monitoring IHS to a first monitored IHS of the plurality of monitored IHSs that is related to an unlocked physical lock status of the first monitored IHS.

18. The method of claim 15, further comprising:

electronically locking a first monitored IHS of the plurality of monitored IHSs over the network using the monitoring IHS in response to an unlocked physical lock status of the first monitored IHS.

19. The method of claim 15, further comprising:

authorizing at least one monitoring period for a first monitored IHS of the plurality of monitored IHSs by the monitoring IHS.

20. The method of claim 19, wherein the receiving the physical lock status for each of the plurality of monitored IHSs by the monitoring IHS over the network comprises receiving the physical lock status for the first monitored IHS only during the at least one monitoring period.

* * * * *